United States Patent [19]

Hink et al.

[11] Patent Number: 4,926,100

[45] Date of Patent: May 15, 1990

[54] ZERO-TORQUE EDDY CURRENT MOTOR SYSTEM AND METHOD FOR CONTROLLING SAME

[75] Inventors: Karl M. Hink; Joseph R. Pottebaum, both of Brookfield; Jerome J. Reichard, Menomonee Falls; Bruce C. Wagner, Wauwatosa; Douglas B. Weber, Wauwatosa; Theodore O. Wiesendanger, Germantown, all of Wis.

[73] Assignee: A. O. Smith Corporation, Milwaukee, Wis.

[21] Appl. No.: 201,551

[22] Filed: Jun. 2, 1988

[51] Int. Cl.⁵ .............................................. G05B 5/01
[52] U.S. Cl. ..................................... 318/269; 318/624
[58] Field of Search ............... 318/269, 281, 283, 563, 318/561, 132, 138, 624, 282, 439

[56] References Cited

U.S. PATENT DOCUMENTS

| | | | |
|---|---|---|---|
| 2,886,149 | 5/1959 | Bauermann | 192/18 |
| 3,178,598 | 4/1965 | Cohen et al. | 310/98 |
| 3,351,791 | 11/1967 | Smith et al. | 310/94 |
| 3,374,374 | 3/1968 | Smith | 310/94 |
| 3,394,278 | 7/1968 | Schetinin | 310/105 |
| 3,519,907 | 7/1970 | White et al. | 318/132 X |
| 3,599,062 | 8/1971 | Crane et al. | 318/281 |
| 4,090,112 | 5/1978 | Selverstone | 318/132 X |
| 4,200,827 | 4/1980 | Oswald | 318/561 |
| 4,300,080 | 11/1981 | Lee | 318/624 X |
| 4,445,075 | 4/1984 | Fry | 318/283 X |
| 4,594,535 | 6/1986 | Morikawa | 318/563 X |
| 4,651,067 | 3/1987 | Ito et al. | 318/439 X |

Primary Examiner—Vit W. Miska
Assistant Examiner—A. Jonathan Wysocki
Attorney, Agent, or Firm—Niro, Scavone, Haller & Niro, Ltd.

[57] ABSTRACT

A variable speed eddy current electric motor includes a zero-torque regulating circuit that senses and responds to the current flowing through an eddy current motor field coil. As the magnitude of the field coil's current is changed by the eddy current motor's speed control circuit, the operating method of the zero-torque regulating circuit supplies varying amounts of current to flow through the field coil in a direction opposite to that of the current applied thereto by the speed control circuit. Thus, when the eddy current motor's speed control circuit no longer causes any current to flow through the field coil, the current supplied to the field coil by the zero-torque regulating circuit produces a magnetic filed that removes all torque from the eddy current motor's output shaft.

41 Claims, 2 Drawing Sheets

ZERO-TORQUE EDDY CURRENT MOTOR SYSTEM AND METHOD FOR CONTROLLING SAME

TECHNICAL FIELD

The present invention relates generally to eddy current motor systems and methods for controlling such motor systems. More particularly, this invention relates to variable speed, eddy current electric motors adapted for controllably driving either constant torque or varying torque loads throughout an entire speed range.

BACKGROUND OF THE INVENTION

Eddy current electric motors are a type of variable speed, alternating current electric motor used for a variety of applications and frequently used in industrial applications. The structure of such eddy current motors is well known and typically includes a support assembly on one side of which is secured a power input assembly. The power input assembly typically includes an alternating current induction motor having an output shaft and a cup-shaped drum secured to the shaft. The induction motor rotates the output shaft and drum at a constant speed determined by the induction motor's design and the frequency of the supplied alternating current power. The drum rotated by the induction motor is fabricated from a magnetically soft metal such as iron.

Opposite the input assembly, typically secured to the other side of the eddy current motor's support assembly, is a variable speed output assembly. The output assembly preferably includes a star-shaped inductor which fits snugly within, but does not mechanically contact, the power input assembly's cup-shaped drum. This inductor, which is also fabricated from a magnetically soft metal such as iron, is positioned within the drum on one end of the eddy current motor's output shaft. This shaft is supported within the output assembly and is rotatable together with the star-shaped inductor about an axis coaxial with that of the input assembly's drum.

Eddy current motors also typically include a stationary field coil secured to the output assembly adjacent to the inductor and proximate the rotating drum. In operation, an electric current is applied to the field coil producing a magnetic field which envelopes the inductor and the drum. The rotation of the drum about the star-shaped inductor in the presence of this magnetic field generates eddy currents in the rotating drum. The generation of such eddy currents results in a torque being applied to the inductor that urges the eddy current motor's output shaft to rotate.

The rotational speed of the eddy current motor's output shaft can be sensed with a tachometer generator. Properly applying the tachometer generator's output voltage to an electronic circuit that controls the current flowing through the field coil provides control of the eddy current motor's output shaft including the speed of rotation of the shaft. In addition, electronic control circuitry may be designed to control speed of rotation of the eddy motor's output shaft by varying a speed control electronic signal supplied thereto.

In principle, an eddy current motor should produce no torque on its output shaft if the current flowing through the field coil is reduced to zero. However, the rotating drum and inductor, as well as the respective mechanical structures of the input, output, and support assemblies of the previously known eddy current motors described above, are all fabricated from magnetically soft materials which retain some remanent magnetism even when no current flows through the field coil. Therefore, after initial operation of such eddy current motors, the input assembly's drum and the output assembly's inductor retain significant magnetization even when no current flows through the field coil.

During energization of the induction motor of previously known eddy current motors, the remanent magnetism present at the motor's drum and inductor causes a torque to be applied to the eddy current motor's output shaft even when no current flows through the field coil. Thus, while the induction motor is running and the eddy current motor's output shaft is freed from any driving load, the output shaft continues turning even if no current flows through the field coil. Therefore, known eddy current motors only provide complete removal of torque from an unloaded shaft after the induction motor is turned off and the induction motor's output shaft stops rotating. The torque present on the output shaft of eddy current motors known to date, when the induction motor is running, has deleterious effects in many industrial applications for variable speed electrical motor drives. Accordingly, it is desirable and beneficial in a variety of applications to provide an eddy current electric motor having control circuitry which substantially eliminates all torque from the output shaft without turning off the induction motor.

An example of a class of industrial applications which benefits from a variable speed eddy current electric motor whose output torque can be substantially reduced, and preferably be reduced to zero, is winding or unwinding webs of materials such as films, textiles, metal foils, or paper. In these winding applications, a roll receives or delivers a web which typically flows through a processing apparatus at a constant linear velocity.

For example, a roll receiving a web may be stationary when the web is first attached. After the web is secured and operation begins, the roll must then be accelerated immediately to its highest speed for winding the web since the roll is at its smallest diameter. As the diameter of the roll increases, its rate of rotation proportionally decreases. When the roll is fully wound, it must then be stopped quickly so the web may be disconnected and attached to the next empty roll.

If, rather than winding the web onto a roll, the web must be unwound for further processing, the torque requirements for the variable speed motor drive are reversed from those for winding the web. That is, the electric motor must start smoothly and slowly while accelerating the mass of the web already wound onto the roll. As the roll unwinds, the motor's speed must increase proportionally until the web is completely unwound at which time the roll must be stopped. In these types of web processing applications, the quality of the product can be adversely affected if the tension in the web changes as it is wound onto or unwound from the roll.

Another class of industrial applications which may require a variable speed eddy current electric motor whose output torque can be reduced to zero is driving low friction machine tools and conveyors. At certain times, the motion of such devices must be halted after which they must be restarted with their motion being gradually increased up to full operating speed. Such operation is difficult to achieve if the output torque of the variable speed driving motor cannot be reduced to zero while it remains energized.

SUMMARY OF THE PRESENT INVENTION

An object of the present invention is to provide a variable speed eddy current electric motor and a method for controlling a variable speed eddy current electric motor such that no torque is applied to the output shaft of the motor when the speed control circuitry causes no current to flow through the field coil.

Another object of the present invention is to provide a variable speed eddy current electric motor whose output shaft may be controllably stopped and started over the full range of motor torque available.

Further, it is an object of the present invention to provide an electronically controlled variable speed eddy current electric motor whose output shaft may be completely stopped.

A further object of the present invention is to provide a low power dissipation electronic circuit for removing all torque from the output shaft of a variable speed eddy current electric motor when the speed control circuitry supplies no current to the field coil. It is also an object of the present invention to provide a reduced cost variable speed eddy current electric motor having compact reduced power dissipating electronic circuitry to controllably stop and start the output shaft of the motor.

The variable speed eddy current electric motor of the present invention includes an output assembly having an output shaft which may be controllably stopped or started, and a constant speed motor having a rotatably supported constant speed motor output shaft. A drum is secured to the constant speed motor output shaft and rotates with that shaft. The eddy current electric motor also includes an inductor juxtaposed to the drum and secured to one end of the eddy current motor output shaft to rotate with that shaft. A field coil is associated with the inductor and drum for applying a magnetic field to both the inductor and drum when an electric current flows through the field coil. When the drum rotates in the presence of the magnetic field, the inductor applies a torque, controlled by the magnitude of the current flowing through the field coil, to the eddy current motor output shaft.

The present eddy current electric motor also includes a speed control circuit for sensing the rotation of the eddy current motor output shaft and for supplying a controlled magnitude current to the field coil. The speed control circuit is also adapted for receiving a speed control signal in response to which the speed control circuit regulates the current flowing through the field coil. This controls rotation of the eddy current motor output shaft.

The eddy current electric motor of the present invention also includes a zero-torque regulating circuit responsive to the magnitude of the electrical signal flowing through the field coil for supplying a remanent magnetism counterbalancing current to the field coil if the speed control circuit supplies no current to the field coil. Upon application of the remanent magnetism counterbalancing current to the field coil, the inductor no longer applies any torque to the eddy current motor output shaft.

In operation of the apparatus and in carrying out of the method of the present invention, as the magnitude of the field coil's signal decreases, the zero-torque regulating circuit supplies an increasingly larger current through the field coil. This current is supplied in a direction opposite to that of the current applied to the field coil by the eddy current motor's speed control circuit. Thus, when the eddy current motor's speed control circuit no longer supplies a current to the field coil, the current supplied to the field coil by the zero-torque regulating circuit produces a magnetic field that opposes the eddy current motor's remanent magnetism. By supplying a proper magnitude signal from the zero-torque regulating circuit to the field coil when the eddy current motor's speed control circuit no longer supplies any signal to the field coil, the motor's remanent magnetism may be exactly counterbalanced at the motor's drum and inductor. Accordingly, all torque is controllably removed from the eddy current motor's output shaft.

Because the zero-torque regulating circuit senses and responds to the signal flowing through the eddy current motor's field coil, if the speed control circuit increases that signal, the zero-torque regulating circuit correspondingly reduces the current that it supplies to the field coil. In the preferred embodiment, only a minimal amount of current flows through the zero-torque regulating circuit when the speed control circuit fully energizes the eddy current motor's field coil. By greatly reducing the current flowing through the zero-torque regulating circuit when the field coil is fully energized, the power dissipated in the zero-torque regulating circuit drops to only a small fraction of that dissipated therein when the eddy current motor applies no torque to its output shaft.

These and other features, objects and advantages will become apparent from the following detailed description of the preferred embodiments, the accompanying drawings, and the appended claims.

DETAILED DESCRIPTION OF THE PREFERRED EMBODIMENTS

While the present invention is susceptible of embodiment in various forms, there is shown in the drawings, and will hereinafter be described in detail, alternative embodiments of the present invention. Further, the present disclosure is to be considered as an exemplification of the invention and is not intended to limit the invention to the specific embodiments illustrated.

Figure 1:
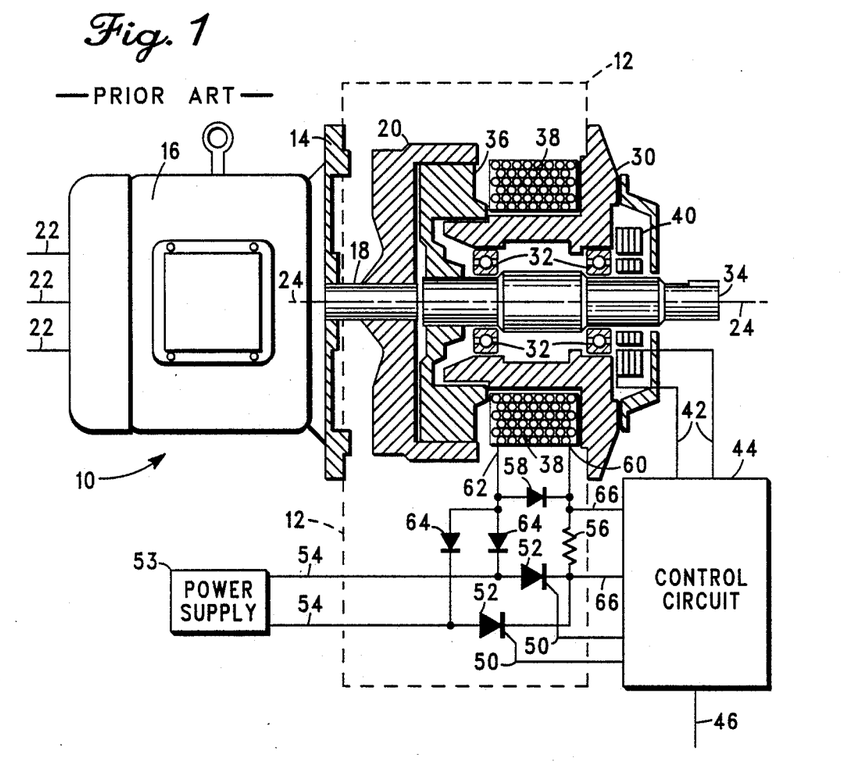
FIG. 1 is a partially sectioned, plan view depicting a prior art eddy current motor together with a functional type block diagram of its speed control circuit.

Referring first to FIG. 1, a typical variable speed, eddy current electric motor is illustrated and referred to by the general reference character 10. Eddy current motor 10 includes a support assembly 12 illustrated in FIG. 1 by a broken line rectangle. Secured to one side of support assembly 12 is a power input assembly 14. Power input assembly 14 includes a constant speed motor, illustrated herein as an alternating current induction motor 16 having an output member such as output shaft 18. It may be appreciated by those skilled in the art that the output member may include, but is not limited to, a shaft, hub and the like.

Secured to output shaft 18 is a drum 20, preferably cup-shaped in construction, fabricated from a magnetically soft metal such as iron or the like. Electric power, preferably alternating current electric power, is supplied to energize induction motor 16 via induction motor power leads 22. Both output shaft 18 and drum 20 rotate in unison about a common axis of rotation 24 when induction motor 16 is energized. Induction motor 16 rotates drum 20 at a constant speed determined by its design and by the frequency of the supplied power.

Secured to the other side of support assembly 12, opposite to induction motor 16, is an output assembly 30. Rotatably supported within output assembly 30 by bearings 32 is an eddy current motor output member such as eddy current motor output shaft 34. As may be appreciated, the eddy current output member may include, but is not limited to, a shaft, hub and the like. Secured within support assembly 12, to one end of eddy current motor output shaft 34, is an inductor 36. Inductor 36 is fabricated from a magnetically soft metal such as iron or the like and preferably in the shape of a multi-pointed star, although the inductor could also be in the shape of a bar, triangle, "X" or cross.

Inductor 36 is juxtaposed with drum 20 and preferably fits snugly within, but does not mechanically contact the drum. Both inductor 36 and eddy current motor output shaft 34 are rotatably supported by output assembly 30 within support assembly 12. Further, both inductor 36 and eddy current motor output shaft 34 are rotatable about axis of rotation 24.

As further illustrated in FIG. 1, secured to output assembly 30, substantially adjacent to inductor 36, is a stationary field coil 38. As illustrated, field coil 38 is preferably positioned on the opposite side of output assembly 30 from drum 20 and preferably immediately adjacent to inductor 36. Located within output assembly 30, furthest from inductor 36, is a tachometer generator 40 for sensing the rotation, and preferably the speed of rotation, of eddy current motor output shaft 34 and for producing an electrical signal proportional thereto. A pair of tachometer output leads 42 couple the electrical signal produced by tachometer generator 40 to an electronic motor control circuit 44. A speed control signal is also supplied to electronic motor control circuit 44 via a speed control signal lead 46.

In response to the speed control signal and to the output signal from tachometer generator 40, the electronic motor control circuit 44 produces electrical signals that are coupled via a pair of control signal lines 50 to control terminals of a pair of silicon controlled rectifiers ("SCRs") 52. The anode of each SCR 52 is also connected respectively to one of a pair of alternating current power leads 54 supplied with alternating current by power supply 53. The cathode of each SCR 52 is connected in common with one terminal of a current sensing resistor 56. The other terminal of current sensing resistor 56 is connected to the cathode of a flywheel diode 58 and to a first terminal 60 of field coil 38. A second terminal 62 of field coil 38 and the anode of flywheel diode 58 are connected in common with the anodes of a pair of rectifiers 64. The cathodes of rectifiers 64 are respectively connected to alternating current power leads 54.

In operation, when SCRs 52 are activated by signals from electronic motor control circuit 44, the electrical circuit made up of SCRs 52, current sensing resistor 56, field coil 38 and rectifiers 64 causes a direct current to flow through field coil 38. As illustrated, the voltage present across current sensing resistor 56 is proportional to the current that flows through SCRs 52 and rectifiers 64 in response to control signals from electronic motor control circuit 44. Further, the voltage across current sensing resistor 56 is supplied via a pair of field coil current signal leads 66 as a feedback signal to electronic motor control circuit 44.

In response to the various input signals received via tachometer output leads 42, speed control signal lead 46 and field coil current signal leads 66, electronic motor control circuit 44 produces control signals for turning on SCRs 52. Thus, SCRs 52 are turned on during controlled time intervals in each successive period of the alternating current power present on alternating current power leads 54. Each time SCRs 52 are turned on, a pulse of direct current is supplied to field coil 38. Each successive pulse of direct current ends when the conducting SCR turns off in response to the voltage then present across it. Due to inductance of field coil 38, during time intervals in which both SCRs 52 are turned off, a circulating current continues to flow through field coil 38 via flywheel diode 58. Thus, a direct current continuously flows through field coil 38 whenever SCRs 52 are being turned on by control signals from electronic motor control circuit 44.

The direct current that flows through field coil 38, in response to control signals from electronic motor control circuit 44, produces a magnetic field which envelopes inductor 36 and drum 20. The rotation of drum 20 by induction motor 16 about inductor 36 in the presence of this magnetic field generates eddy currents in the rotating drum. The generation of these eddy currents results in a torque being applied to inductor 36 that urges eddy current motor output shaft 34 to rotate. The signal produced by tachometer generator 40 in response to rotation of eddy current motor output shaft 34 allows the electronic motor control circuit 44 to appropriately control the current flowing through field coil 38. In turn, the rotational speed of eddy current motor output shaft 34 is thereby controlled through motor control circuit 44 by the signal present on the speed control signal lead 46.

Thus, the combination of tachometer generator 40, electronic motor control circuit 44, SCRs 52, and current sensing resistor 56 operates cooperatively to receive an electronic speed control signal via speed control signal lead 46. This speed control signal provides information concerning the rotation of eddy current motor output shaft 34, and preferably indicates the speed at which the eddy current motor output shaft rotates. This speed control signal also allows control of the magnitude of the signal flowing through field coil 38, and thus preferably controls the rotational speed of eddy current motor output shaft 34.

The control signals from the electronic motor control circuit 44 regulate the magnitude of the current flowing through field coil 38 to control the rotational speed of eddy current motor output shaft 34 despite changes in the load being driven by eddy current motor 10. For eddy current motors rated at 1 to 10 horsepower, obtaining the maximum rotation speed on eddy current motor output shaft 34 while driving the rated load requires supplying a current of approximately 2.5 amperes to field coil 38 through current sensing resistor 56. Due to the electrical resistance of field coil 38, a potential of approximately 90 volts is present across field coil 38 when it is energized by a current of this magnitude.

For the reasons described previously, the variable speed, eddy current motors of the prior art do not remove all torque from eddy current motor output shaft 34 when the combined tachometer generator 40, electronic motor control circuit 44, SCRs 52, and current sensing resistor 56 reduce the current flowing through field coil 38 to zero. To solve this problem, the eddy current motor system of the present invention includes a zero-torque circuit 100, a circuit diagram of which is depicted within the boundaries of the broken line of FIG. 2. Like numerals are employed to designate like elements in both FIGS. 1 and 2, distinguished by a ("'") designation.

Figure 2:
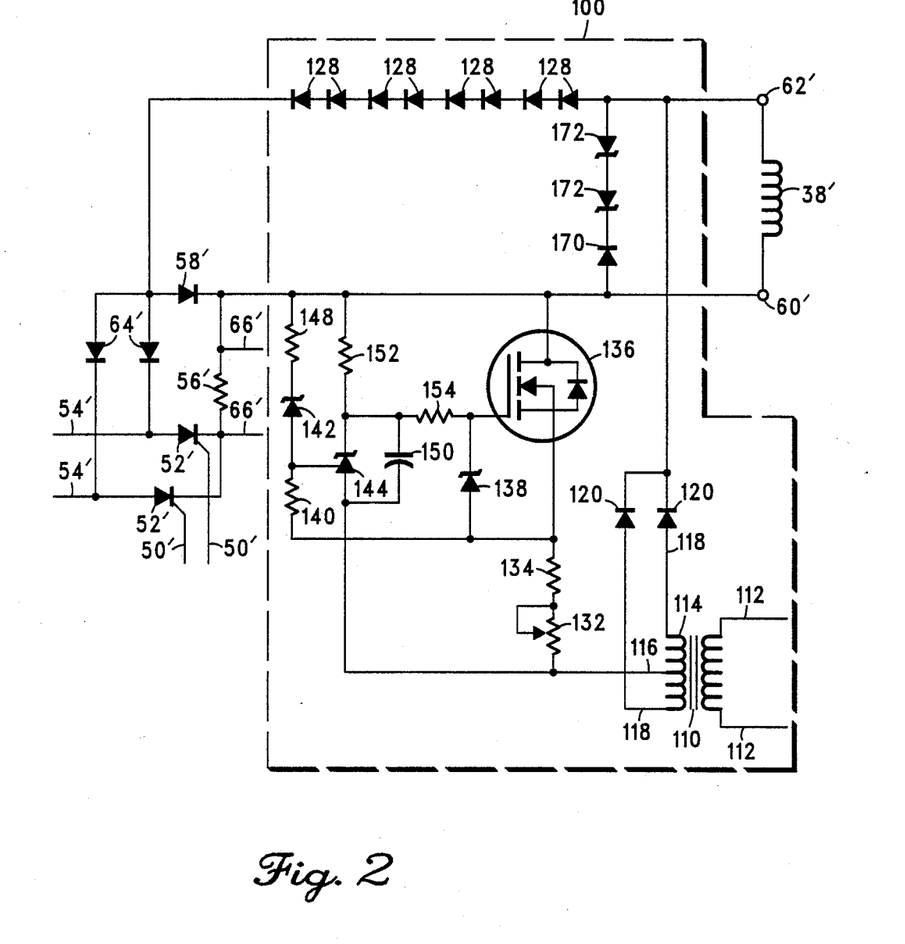
FIG. 2 is a circuit diagram depicting a portion of the speed control circuit of FIG. 1 together with a zero-torque regulating circuit in accordance with the present invention.

As depicted in FIG. 2, the zero-torque circuit 100 of the present invention is inserted into the electronic circuit of a typical eddy current motor, such as the motor of FIG. 1, between first and second terminals 60' and 62' of field coil 38' and flywheel diode 58'. In this location, zero-torque circuit 100 can sense the magnitude of the signal supplied by electronic motor control circuit 44, as well as the condition when the electronic motor control circuit stops supplying current to field coil 38. As may be appreciated by those skilled in the art, the signal that is sensed may be either voltage and/or current, depending o the desired application. When the voltage is no longer supplied or the current stops flowing, zero-torque circuit 100 can supply, alter and control a current that flows in the opposite direction through field coil 38' to create a magnetic field that counterbalances the remanent magnetism present in eddy current motor 10.

To provide a electric current for counterbalancing the remanent magnetism at drum 20 and inductor 36 of eddy current motor 10, zero-torque circuit 100 includes a power supply transformer 110 that is supplied with alternating current power via a pair of primary winding leads 112. The power supply transformer 110 includes a secondary winding 114 having a secondary winding center tap 116. Power supply transformer 110 also has a pair of secondary winding output leads 118 that are connected respectively to anodes of a pair of rectifiers 120. The cathodes of rectifiers 120 are connected to second terminal 62' of field coil 38'. Power supply transformer 110 in combination with rectifiers 120 produce a direct current voltage of approximately 18 volts.

The polarities of rectifiers 120 are directed opposite to those of SCRs 52' and rectifiers 64'. Thus, secondary winding 114 of power supply transformer 110 and rectifiers 120 are arranged to provide a direct current to field coil 38' that flows in the direction opposite to that supplied by SCRs 52' and rectifiers 64'. To prevent such oppositely directed current from flowing not through field coil 38' but rather through flywheel diode 58', the zero-torque circuit 100 also includes eight diodes 128 connected in series, anode to cathode, between second terminal 6' of field coil 38' and the anode of flywheel diode 58'. The cumulative forward voltage drop of these eight diodes 128, combined with the forward voltage drop of flywheel diode 58', is larger than the voltage present across field coil 38' when a current sufficient to counterbalance the remanent magnetism flows through the field coil. Thus, these series connected diodes 128 prevent the remanent magnetism counterbalancing current from flowing through flywheel diode 58'.

Zero-torque circuit 100 also includes a series connected resistor combination made up of variable resistor 132 and resistor 134, one terminal of which is connected to secondary winding center tap 116 of power supply transformer 110. The other terminal of the series connected resistor combination of variable resistor 132 and resistor 134 is connected to the source of a type IRF710 Field Effect Transistor ("FET") 136, the anode of a type 1N4741A zener diode 138, and one terminal of a resistor 140. The other terminal of resistor 140 is connected to the anode of a type 1N4751A zener diode 142 and to the control signal terminal of a type TL431A adjustable zener diode or adjustable shunt regulator 144. The cathode of zener diode 142 is connected through a resistor 148 to first terminal 60' of field coil 38' and to the anode of flywheel diode 58', which are all also connected to the drain of FET 136. Thus, the series connection of resistor 148, zener diode 142, and resistor 140 form a voltage divider across FET 136 for applying a reference voltage to the control terminal of adjustable shunt regulator 144.

A capacitor 150 is connected in parallel with adjustable shunt regulator 144 while its anode is connected to secondary winding center tap 116 of power supply transformer 110. The cathode of adjustable shunt regulator 144 is connected through a resistor 152 to first terminal 60' of field coil 38' and the anode of flywheel diode 58', and through another resistor 154 to the gate of FET 136. The series connection of resistor 152 and resistor 154 applies a drive voltage to the gate of FET 136.

Capacitor 150 is included in zero-torque circuit 100 to stabilize the circuit's operation. Analogously, zener diode 138 as well as a diode 170 and a pair of zener diodes 172 are included in zero-torque circuit 100 to protect FET 136 from electrical damage. As illustrated in FIG. 2, diode 170 is connected to one cathode of the pair of zener diodes 172. The series connected diode 170 and zener diodes 172 are connected across first terminal 60, 60' and second terminal 62, 62' of field coil 38, 38'.

In operation, an eddy current electric motor practicing the method of the present invention provides that when electronic motor control circuit 44 stops supplying current to the field coil 38, 38', FET 136 is turned fully on by the voltage applied to its gate through resistors 152 and 154. With FET 136 turned fully on, current flows from secondary winding output leads 118 of power supply transformer 110, through rectifiers 120, into second terminal 62, 62' of field coil 38, 38'. Current then flows through field coil 38, 38', and out from its first terminal 60, 60', through FET 136, and then back into secondary winding center tap 116 of power supply transformer 110 through series connected resistor 134 and variable resistor 132. The direction of this current flow is preferably contrariwise or opposite to that supplied to field coil 38, 38' by SCRs 52, 52' and rectifiers 64, 64'.

Furthermore, the magnitude of the signal flowing through field coil 38, 38' may be adjusted by varying the resistance of variable resistor 132. In conjunction with setting the resistance of variable resistor 132, zero-torque circuit 100 regulates the current flowing through field coil 38, 38' to produce that magnetic field at drum 20 and inductor 36 which counterbalances the remanent magnetism of eddy current motor 10 and thereby reduces to zero the torque applied by inductor 36 to eddy current motor output shaft 34.

Solely as an example, for eddy current motor 10 rated at 1 to 10 horsepower, the remanent magnetization counterbalancing current is approximately 60 to 100 milliamperes ("ma"). While the exact current required to counterbalance the remanent magnetization depends upon the characteristics of each individual motor, a particular motor's characteristics do not change significantly over time. Consequently, once zero-torque circuit 100 has been adjusted to provide a remanent magnetization counterbalancing current for a particular motor, there is generally no need for subsequent readjustment.

If the combined tachometer generator 40, electronic motor control circuit 44, SCRs 52, 52', and current sensing resistor 56, 56' begin supplying current to energize field coil 38, 38', due to superposition of currents, the net current flowing through field coil 38, 38' will be correspondingly reduced and inductor 36 will start to apply a torque to eddy current motor output shaft 34. Simultaneously, the voltage across FET 136, and correspondingly across series connected resistor 148, zener diode 142, and resistor 140, will increase. If the voltage across series connected resistor 148, zener diode 142, and resistor 140 increases sufficiently to approach the zener voltage of diode 142, the voltage applied to the control signal terminal of adjustable shunt regulator 144 causes adjustable shunt regulator 144 to reduce the drive voltage applied to the gate of FET 136.

Thus, FET 136 is turned off progressively as the current supplied to the field coil 38 by the combined tachometer generator 40, electronic motor control circuit 44, SCRs 52, 52', and current sensing resistor 56, 56' increases. At a sufficiently high current, FET 136 is turned completely off and power dissipation in zero-torque circuit 100 is due only to currents flowing through series connected resistor 148, zener diode 142, resistor 140, resistor 134, and variable resistor 132, and through series connected resistor 152 and adjustable shunt regulator 144.

In this manner, zero-torque circuit 100 actually turns itself off as the speed and/or power output of eddy current motor 10 increases. Note that in this preferred embodiment, zero-torque circuit 100 turns off progressively, not suddenly. Thus, there can be no abrupt changes in the torque applied to eddy current motor output shaft 34. Furthermore, progressive turn off of zero-torque circuit 100 insures that no deleterious affect of the operation of eddy current motor 10 occurs due to electronic circuit 44. In this same manner, if the combined tachometer generator 40, electronic motor control circuit 44, SCRs 52, 52', and current sensing resistor 56, 56' reduce the current supplied to field coil 38, 38', the zero-torque circuit 100 once again turns on to supply a correspondingly larger current to field coil 38, 38'. Thus, eddy current motor 10 in accordance with the present invention can controllably start and stop its eddy current motor output shaft 34 regardless of changes in the load driven by the shaft.

When eddy current motor 10 is fully energized to produce its maximum rotation speed while driving its rated load, the current flowing through zero-torque circuit 100 is approximately 6 ma, or approximately one-tenth or less of the current that flows through zero-torque circuit 100 when the remanent magnetization is being counterbalanced. Correspondingly, the voltage applied across zero-torque circuit 100 may change by up to 90 volts when field coil 38, 38' is fully energized, due to the increase in the output voltage of the electronic circuit 44. However, under this operating condition, the power dissipated in zero-torque circuit 100 actually decreases, rather than increases. This power dissipation is preferably in the range of approximately one-half to one-tenth of the power which is dissipated when the zero-torque circuit 100 supplies the remanent magnetism counterbalancing current to the field coil. Because of this low power dissipation, zero-torque circuit 100 of the present invention may be enclosed in a much more compact and commercially practical housing than if the current flowing through the zero-torque circuit remained constant or even increased in response to the increased voltage across the zero-torque circuit.

Figure 3:
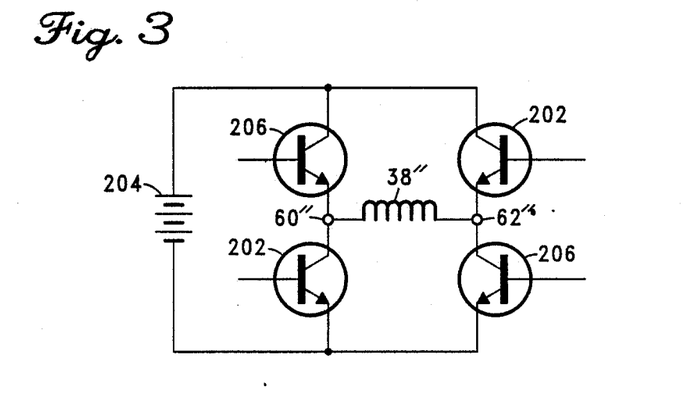
FIG. 3 is a schematic representation of an alternative embodiment of the zero-torque regulating circuit of the present invention.

Referring now to FIG. 3, a schematic representation of an alternative embodiment of the zero-torque circuit, generally designated by the reference character 200, is illustrated in accordance with the present invention. Those elements depicted in FIGS. 1 and 2 that are common to zero-torque circuit 200 of FIG. 3 carry the same reference numeral distinguished by a ("''") designation.

In the embodiment of FIG. 3, a pair of drive current transistors 202 are respectively connected to first terminal 60" and second terminal 62" of field coil 38". The drive current transistors 202 provide current from a power source, schematically depicted as a battery 204, to energize field coil 38" when the eddy current motor 10 drives a load. A second pair of zero-torque current transistors 206 are also respectively connected to first terminal 60" and second terminal 62" of field coil 38" for providing a remanent magnetism counterbalancing current to field coil 38". As described above with respect to FIG. 2, this remanent magnetism counterbalancing current controllably reduces the output torque of the eddy current motor 10 to zero. Appropriate control signals applied to the control electrodes of the drive current transistors 202 and zero torque current transistors 206 allow the circuit of FIG. 3 to control the operation of the eddy current motor 10 identically to that of the zero-torque circuit 100 of FIG. 2.

The advantages which the alternative embodiment zero-torque circuit 200 has in comparison with the zero-torque circuit 100 are that it eliminates the eight series connected diodes 128, as well as also eliminating the power supply transformer 110 and its associated rectifiers 120. Thus, the alternative embodiment zero-torque circuit 200 may further simplify the circuitry required to energize the field coil 38, 38', and 38", depending on the environment in which the variable speed eddy current motor is used.

Although the present invention has been described in terms of the presently preferred embodiments, it is to be understood that such disclosure is purely illustrative and is not to be interpreted as limiting. As described above, in response to changes in the magnitude of the current supplied to the field coil 38, 38', 38", zero-torque circuits 100 and 200 progressively alter the current flowing through themselves to simultaneously provide reduced power dissipation and smooth control of eddy current motor 10. Though less desirable, it is apparent that this current and power reduction could alternatively be obtained by more abruptly altering the current flowing through zero-torque circuits 100 and 200 as the magnitude of the current flowing through field coil 38, 38 , 38" reaches some pre-established value. Consequently, without departing from the spirit and scope of the invention, various alterations, modifications, and/or alternative applications of the invention will, no doubt, be suggested to those skilled in the art after having read the preceding disclosure. Accordingly, it is intended that the invention and this disclosure be interpreted as encompassing all alterations, modifications, or alternative applications as fall within the true spirit and scope of the invention.

What is claimed is:

1. A variable speed eddy current motor having an output shaft whose rotation may be controllably stopped or started, said eddy current motor comprising:
   a constant speed motor having a rotatably supported constant speed motor output shaft;
   a drum secured to said constant speed motor output shaft to rotate therewith;
   an output assembly including said eddy current motor output shaft;
   an inductor secured to one end of said eddy current motor output shaft to rotate therewith, said inductor being juxtaposed with said drum;
   a field coil for applying a magnetic field to both said drum and said inductor when an electric current flows through said field coil, said drum rotating in the presence of said magnetic field causing said inductor to apply a torque to said eddy current motor output shaft, said torque being controlled by the magnitude of the current flowing through said field coil;
   speed control means for sensing the rotation of said eddy current motor output shaft and for supplying a current having a controlled magnitude to said field coil, said speed control means also being adapted for receiving a speed control signal in response to which said speed control means regulates the current flowing through said field coil to control the rotation of said eddy current motor output shaft; and
   zero-torque regulating means responsive to the magnitude of the electrical current flowing through said field coil for supplying a remanent magnetism counterbalancing current to said field coil if said speed control means supplies no current to said field coil, upon the application of said remanent magnetism counterbalancing current said inductor no longer applies any torque to said eddy current motor output shaft.

2. The eddy current motor of claim 1 wherein said zero-torque regulating means alters the current flowing through said zero-torque regulating means responsive to and contrariwise to the magnitude of the current that said speed control means supplies to said field coil.

3. The eddy current motor of claim 2 wherein a decreased current flow through said zero-torque regulating means when said speed control means fully energizes said field coil results in a reduction of power dissipated in said zero-torque regulating means in relation to the power dissipated in said zero-torque regulating means when said zero-torque regulating means supplies said remanent magnetism counterbalancing current to said field coil.

4. The eddy current motor of claim 2 wherein a decreased current flow through said zero-torque regulating means when said speed control means fully energizes said field coil results in a reduction of the power dissipated in said zero-torque regulating means to at least one-half of the power dissipated in said zero-torque regulating means when said zero-torque regulating means supplies said remanent magnetism counterbalancing current to said field coil.

5. The eddy current motor of claim 2 wherein a decreased current flow through said zero-torque regulating means when said speed control means fully energizes said field coil results in a reduction of the power dissipated in said zero-torque regulating means to at least one-third of the power dissipated in said zero-torque regulating means when said zero-torque regulating means supplies said remanent magnetism counterbalancing current to said field coil.

6. The eddy current motor of claim 2 wherein a decreased current flow through said zero-torque regulating means when said speed control means fully energizes said field coil results in a reduction of the power dissipated in said zero-torque regulating means to at least one-fourth of the power dissipated in said zero-torque regulating means when said zero-torque regulating means supplies said remanent magnetism counterbalancing current to said field coil.

7. The eddy current motor of claim 2 wherein a decreased current flow through said zero-torque regulating means when said speed control means fully energizes said field coil results in a reduction of the power dissipated in said zero-torque regulating means to at least one-fifth of the power dissipated in said zero-torque regulating means when said zero-torque regulating means supplies said remanent magnetism counterbalancing current to said field coil.

8. The eddy current motor of claim 1 wherein said zero-torque regulating means alters the current flowing through said zero-torque regulating means contrariwise to the magnitude of the current that said speed control means supplies to said field coil if that magnitude reaches a pre-established value.

9. The eddy current motor of claim 8 wherein a decreased current flow through said zero-torque regulating means when said speed control means fully energizes said field coil results in a reduction of power dissipated in said zero-torque regulating means in relation to the power dissipated in said zero-torque regulating means when said zero-torque regulating means supplies said remanent magnetism counterbalancing current to said field coil.

10. The eddy current motor of claim 8 wherein a decreased current flow through said zero-torque regulating means when said speed control means fully energizes said field coil results in a reduction of the power dissipated in said zero-torque regulating means to at least one-half of the power dissipated in said zero-torque regulating means when said zero-torque regulating means supplies said remanent magnetism counterbalancing current to said field coil.

11. The eddy current motor of claim 8 wherein a decreased current flow through said zero-torque regulating means when said speed control means fully energizes said field coil results in a reduction of the power dissipated in said zero-torque regulating means to at least one-third of the power dissipated in said zero-torque regulating means when said zero-torque regulating means supplies said remanent magnetism counterbalancing current to said field coil.

12. The eddy current motor of claim 8 wherein a decreased current flow through said zero-torque regulating means when said speed control means fully energizes said field coil results in a reduction of the power dissipated in said zero-torque regulating means to at least one-fourth of the power dissipated in said zero-torque regulating means when said zero-torque regulating means supplies said remanent magnetism counterbalancing current to said field coil.

13. The eddy current motor of claim 8 wherein a decreased current flow through said zero-torque regulating means when said speed control means fully energizes said field coil results in a reduction of the power dissipated in said zero-torque regulating means to at least one-fifth of the power dissipated in said zero-torque regulating means when said zero-torque regulating means supplies said remanent magnetism counterbalancing current to said field coil.

14. A zero-torque circuit for controlling the starting and stopping of a rotatable output shaft of a variable speed eddy current motor, said eddy current motor including a constant speed motor having a rotatable constant speed motor output shaft, said eddy current motor also including a drum secured to said constant speed motor output shaft to rotate therewith, said eddy current motor further including an inductor secured to one end of said eddy current motor output shaft to rotate therewith, said inductor being juxtaposed with said drum of said eddy current motor, said eddy current motor additionally including a field coil for applying a magnetic field to both said drum and said inductor when an electric current flows through said field coil, said drum rotating in the presence of said magnetic field causing said inductor to apply a torque to said eddy current motor output shaft, said torque being controlled by the magnitude of the current flowing through said field coil, said eddy current motor also including speed control means for sensing the rotation of said eddy current motor output shaft and for supplying a current having a controlled magnitude to said field coil, said speed control means also being adapted for receiving a speed control signal in response to which said speed control means regulates the current flowing through said field coil to control the rotation of said eddy current motor output shaft, said zero-torque circuit comprising:

zero-torque regulating means responsive to the magnitude of the electrical current flowing through said field coil for supplying a remanent magnetism counterbalancing current to said field coil if said speed control means supplies no current to said field coil, upon the application of said remanent magnetism counterbalancing current said inductor no longer applies any torque to said eddy current motor output shaft.

15. The zero-torque circuit of claim 14 wherein said zero-torque regulating means alters the current flowing through said zero-torque regulating means responsive to and contrariwise to the magnitude of the current that said speed control means supplies to said field coil.

16. The eddy current motor of claim 15 wherein a decreased current flow through said zero-torque regulating means when said speed control means fully energizes said field coil results in a reduction of power dissipated in said zero-torque regulating means in relation to the power dissipated in said zero-torque regulating means when said zero-torque regulating means supplies said remanent magnetism counterbalancing current to said field coil.

17. The zero-torque circuit of claim 15 wherein a decreased current flow through said zero-torque regulating means when said speed control means fully energizes said field coil results in a reduction of the power dissipated in said zero-torque regulating means to at least one-half of the power dissipated in said zero-torque regulating means when said zero-torque regulating means supplies said remanent magnetism counterbalancing current to said field coil.

18. The zero-torque circuit of claim 15 wherein a decreased current flow through said zero-torque regulating means when said speed control means fully energizes said field coil results in a reduction of the power dissipated in said zero-torque regulating means to at least one-third of the power dissipated in said zero-torque regulating means when said zero-torque regulating means supplies said remanent magnetism counterbalancing current to said field coil.

19. The zero-torque circuit of claim 15 wherein a decreased current flow through said zero-torque regulating means when said speed control means fully energizes said field coil results in a reduction of the power dissipated in said zero-torque regulating means to at least one-fourth of the power dissipated in said zero-torque regulating means when said zero-torque regulating means supplies said remanent magnetism counterbalancing current to said field coil.

20. The zero-torque circuit of claim 15 wherein a decreased current flow through said zero-torque regulating means when said speed control means fully energizes said field coil results in a reduction of the power dissipated in said zero-torque regulating means to at least one-fifth of the power dissipated in said zero-torque regulating means when said zero-torque regulating means supplies said remanent magnetism counterbalancing current to said field coil.

21. The zero-torque circuit of claim 14 wherein said zero-torque regulating means alters the current flowing through said zero-torque regulating means contrariwise to the magnitude of the current that said speed control means supplies to said field coil if that magnitude reaches a pre-established value.

22. The eddy current motor of claim 21 wherein a decreased current flow through said zero-torque regulating means when said speed control means fully energizes said field coil results in a reduction of power dissipated in said zero-torque regulating means in relation to the power dissipated in said zero-torque regulating means when said zero-torque regulating means supplies said remanent magnetism counterbalancing current to said field coil.

23. The zero-torque circuit of claim 21 wherein a decreased current flow through said zero-torque regulating means when said speed control means fully energizes said field coil results in a reduction of the power dissipated in said zero-torque regulating means to at least one-half of the power dissipated in said zero-torque regulating means when said zero-torque regulating means supplies said remanent magnetism counterbalancing current to said field coil.

24. The zero-torque circuit of claim 21 wherein a decreased current flow through said zero-torque regulating means when said speed control means fully energizes said field coil results in a reduction of the power dissipated in said zero-torque regulating means to at least one-third of the power dissipated in said zero-torque regulating means when said zero-torque regulating means supplies said remanent magnetism counterbalancing current to said field coil.

25. The zero-torque circuit of claim 21 wherein a decreased current flow through said zero-torque regulating means when said speed control means fully energizes said field coil results in a reduction of the power dissipated in said zero-torque regulating means to at least one-fourth of the power dissipated in said zero-torque regulating means when said zero-torque regulating means supplies said remanent magnetism counterbalancing current to said field coil.

26. The zero-torque circuit of claim 21 wherein a decreased current flow through said zero-torque regulating means when said speed control means fully energizes said field coil results in a reduction of the power dissipated in said zero-torque regulating means to at least one-fifth of the power dissipated in said zero-torque regulating means when said zero-torque regulating means supplies said remanent magnetism counterbalancing current to said field coil.

27. A method for controllably reducing to zero the torque present on an output shaft of a variable speed eddy current motor, said eddy current motor including a constant speed motor having a rotatable constant speed motor output shaft, said eddy current motor also including a drum secured to said constant speed motor output shaft to rotate therewith, said eddy current motor further including an inductor secured to one end of said eddy current motor output shaft to rotate therewith, said inductor being juxtaposed with said drum of said eddy current motor, said eddy current motor additionally including a field coil for applying a magnetic field to both said drum and said inductor when an electric current flows through said field coil, said drum rotating in the presence of said magnetic field causing said inductor to apply a torque to said eddy current motor output shaft, said torque being controllable by the magnitude of the current flowing through said field coil, said eddy current motor also including speed control means for sensing the rotation of said eddy current motor output shaft and for supplying a current having a controlled magnitude to said field coil, said speed control means also being adapted for receiving a speed control signal in response to which said speed control means regulates the current flowing through said field coil to control the rotation of said eddy current motor output shaft, said method comprising:
sensing the magnitude of the electrical current flowing through said field coil with a zero-torque regulating means as that electrical current flow is regulated by said speed control means; and
supplying a remanent magnetism counterbalancing current to said field coil from said zero-torque regulating means if said speed control means supplies no current to said field coil, upon the application of said remanent magnetism counterbalancing current said inductor no longer applies any torque to said eddy current motor output shaft.

28. The method of claim 27 further comprising the step of altering the current supplied to said field coil by said zero-torque regulating means responsive to and contrariwise to the magnitude of the current that said speed control means supplies to said field coil.

29. The method of claim 28 wherein the step of altering the current reduces the current flow through said zero-torque regulating means when said speed control means fully energizes said field coil to less than the current that flows through said zero-torque regulating means when said zero-torque regulating means supplies said remanent counterbalancing current to said field coil.

30. The method of claim 28 wherein the step of altering the current reduces the current flow through said zero-torque regulating means when said speed control means fully energizes said field coil to at least one-half of the current that flows through said zero-torque regulating means when said zero-torque regulating means supplies said remanent magnetism counterbalancing current to said field coil.

31. The method of claim 28 wherein the step of altering the current reduces the current flow through said zero-torque regulating means when said speed control means fully energizes said field coil to at least one-third of the current that flows through said zero-torque regulating means when said zero-torque regulating means supplies said remanent magnetism counterbalancing current to said field coil.

32. The method of claim 28 wherein the step of altering the current reduces the current flow through said zero-torque regulating means when said speed control means fully energizes said field coil to at least one-fourth of the current that flows through said zero-torque regulating means when said zero-torque regulating means supplies said remanent magnetism counterbalancing current to said field coil.

33. The method of claim 28 wherein the step of altering the current reduces the current flow through said zero-torque regulating means when said speed control mean fully energizes said field coil to at least one-fifth of the current that flows through said zero-torque regulating means when said zero-torque regulating means supplies said remanent magnetism counterbalancing current to said field coil.

34. The method of claim 28 wherein the step of altering the current reduces the current flow through said zero-torque regulating means when said speed control means fully energizes said field coil to at least one-tenth of the current that flows through said zero-torque regulating means when said zero-torque regulating means supplies said remanent magnetism counterbalancing current to said field coil.

35. The method of claim 27 further comprising the step of altering the current supplied to said field coil by said zero-torque regulating means contrariwise to the magnitude of the current that said speed control means supplies to said field coil if that magnitude reaches a pre-established value.

36. The method of claim 35 wherein the step of altering the current flow reduces the current through said zero-torque regulating means when said speed control means fully energizes said field coil to less than the current that flows through said zero-torque regulating means when said zero-torque regulating means supplies said remanent counterbalancing current to said field coil.

37. The method of claim 35 wherein the step of altering the current reduces the current flow through said zero-torque regulating means when said speed control means fully energizes said field coil to at least one-half of the current that flows through said zero-torque regulating means when said zero-torque regulating means supplies said remanent magnetism counterbalancing current to said field coil.

38. The method of claim 35 wherein the step of altering the current reduces the current flow through said zero-torque regulating means when said speed control means fully energizes said field coil to at least one-third of the current that flows through said zero-torque regulating means when said zero-torque regulating means supplies said remanent magnetism counterbalancing current to said field coil.

39. The method of claim 35 wherein the step of altering the current reduces the current flow through said zero-torque regulating means when said speed control means fully energizes said field coil to at least one-fourth of the current that flows through said zero-torque regulating means when said zero-torque regulating means supplies said remanent magnetism counterbalancing current to said field coil.

40. The method of claim 35 wherein the step of altering the current reduces the current flow through said zero-torque regulating means when said speed control means fully energizes said field coil to at least one-fifth of the current that flows through said zero-torque regulating means when said zero-torque regulating means supplies said remanent magnetism counterbalancing current to said field coil.

41. The method of claim 35 wherein the step of altering the current reduces the current flow through said zero-torque regulating means when said speed control means fully energizes said field coil to at least one-tenth of the current that flows through said zero-torque regulating means when said zero-torque regulating means supplies said remanent magnetism counterbalancing current to said field coil.

* * * * *